United States Patent
Staffiere et al.

(10) Patent No.: US 9,016,662 B2
(45) Date of Patent: Apr. 28, 2015

(54) EFFICIENT MANUAL TO AUTOMATIC VALVE CONVERSION DEVICE

(71) Applicant: Custom Controls, LLC, Carlisle, MA (US)

(72) Inventors: Donald Staffiere, Amherst, NH (US);
Don L Drinkwater, Carlisle, MA (US);
David Staffiere, Merrimack, NH (US);
Dana St. James, Mansfield, MA (US);
Jay M Prager, Groton, MA (US)

(73) Assignee: Custom Controls, LLC, Carlisle, MA (US)

(*) Notice: Subject to any disclaimer, the term of this patent is extended or adjusted under 35 U.S.C. 154(b) by 18 days.

(21) Appl. No.: 13/945,183

(22) Filed: Jul. 18, 2013

(65) Prior Publication Data

US 2014/0001383 A1     Jan. 2, 2014

Related U.S. Application Data

(63) Continuation-in-part of application No. 13/334,670, filed on Dec. 22, 2011, now Pat. No. 8,931,755, which is a continuation-in-part of application No. 11/846,559, filed on Aug. 29, 2007, now Pat. No. 8,256,742.

(60) Provisional application No. 60/823,798, filed on Aug. 29, 2006, provisional application No. 61/425,933, filed on Dec. 22, 2010, provisional application No. 61/672,825, filed on Jul. 18, 2012.

(51) Int. Cl.
*F16K 31/05* (2006.01)
*F16K 31/04* (2006.01)

(52) U.S. Cl.
CPC ............... *F16K 31/05* (2013.01); *F16K 31/04* (2013.01); *F16K 31/055* (2013.01)

(58) Field of Classification Search
CPC ....... F16K 31/04; F16K 31/041; F16K 31/05; F16K 31/055
USPC ................... 251/90–93, 129.11–129.13, 292
See application file for complete search history.

(56) References Cited

U.S. PATENT DOCUMENTS

| | | | |
|---|---|---|---|
| 3,085,781 A * | 4/1963 | La Pointe | ........................ 251/67 |
| 3,430,916 A | 3/1969 | Raymond, Jr. | |
| 3,692,043 A | 9/1972 | Waskowsky | |

(Continued)

OTHER PUBLICATIONS

Eaton Electrical, Inc., HOMEheartbeat—Water Shut-off Controller, User's Guide, Copyright 2006, 32 pages, www.homeheartbeat.com.

*Primary Examiner* — John Bastianelli
(74) *Attorney, Agent, or Firm* — Maine Cernota & Rardin (57) ABSTRACT

A powered valve actuator assembly converts a manually operated valve without removal of the valve handle for automated valve operation in response to detection of a preselected condition. The design incorporates a motor, motor control circuit, drive shaft, valve handle engaging member and anti-rotation member. The motor is supported by its drive shaft, which is mounted on the valve handle via an adaptor. The motor, when operated, applies rotational torque to the drive shaft, and is secured from counter rotation about the drive shaft by the anti-rotation member, which extends between the motor and a fixed reference point with respect to the valve body such as the conduit or an extension thereof. The control circuit may incorporate a monitoring sub-circuit and power regulator, which operates at reduced power levels depending on the sensed state of the sensor or sensors.

20 Claims, 5 Drawing Sheets

(56) References Cited

U.S. PATENT DOCUMENTS

| | | | |
|---|---|---|---|
| 4,131,133 | A | 12/1978 | Huwe |
| 4,313,595 | A | 2/1982 | Markley |
| 4,488,567 | A * | 12/1984 | Grant ............................ 137/312 |
| 4,629,157 | A | 12/1986 | Tsuchiya et al. |
| 4,637,423 | A * | 1/1987 | Gray ............................. 251/292 |
| 4,705,063 | A | 11/1987 | Robinson |
| 4,714,233 | A * | 12/1987 | Oates ............................. 251/90 |
| 4,719,939 | A | 1/1988 | Killian |
| 4,887,634 | A | 12/1989 | Killian |
| 4,921,012 | A | 5/1990 | Brattan |
| 5,004,014 | A | 4/1991 | Bender |
| 5,038,820 | A | 8/1991 | Ames et al. |
| 5,086,526 | A | 2/1992 | Van Marcke |
| 5,086,806 | A | 2/1992 | Engler et al. |
| 5,131,623 | A | 7/1992 | Gordani |
| 5,257,771 | A | 11/1993 | Portis et al. |
| 5,409,037 | A | 4/1995 | Wheeler et al. |
| 5,540,414 | A | 7/1996 | Gordani et al. |
| 5,564,461 | A | 10/1996 | Raymond |
| 5,568,825 | A | 10/1996 | Faulk |
| 5,570,869 | A | 11/1996 | Diaz et al. |
| 5,634,486 | A | 6/1997 | Hatting et al. |
| 5,954,088 | A | 9/1999 | Huang |
| 5,967,171 | A | 10/1999 | Dwyer, Jr. |
| 6,065,735 | A | 5/2000 | Clark |
| 6,070,852 | A | 6/2000 | McDonnell et al. |
| 6,125,868 | A | 10/2000 | Murphy et al. |
| 6,170,509 | B1 * | 1/2001 | Karta ............................. 251/292 |
| 6,206,337 | B1 | 3/2001 | Veillet, Jr. |
| 6,253,785 | B1 | 7/2001 | Shumake, Jr. et al. |
| 6,354,322 | B2 * | 3/2002 | Clark ....................... 251/129.11 |
| 6,662,821 | B2 | 12/2003 | Jacobsen et al. |
| 6,701,951 | B1 | 3/2004 | Drinkwater |
| 6,742,765 | B2 | 6/2004 | Takano et al. |
| 6,913,034 | B2 * | 7/2005 | Szafron ............................ 251/14 |
| 7,048,251 | B2 | 5/2006 | Schreiner |
| 7,066,192 | B1 | 6/2006 | Delaney et al. |

\* cited by examiner

EFFICIENT MANUAL TO AUTOMATIC VALVE CONVERSION DEVICE

RELATED APPLICATIONS

This application is a continuation-in-part of U.S. application Ser. No. 13/334,670, filed Dec. 22, 2011, which is a continuation-in-part of U.S. application Ser. No. 11/846,559, filed on Aug. 29, 2007, which claims the benefit of U.S. Provisional Application No. 60/823,798, filed Aug. 29, 2006. U.S. application Ser. No. 13/334,670 also claims the benefit of U.S. Provisional Application No. 61/425,933, filed Dec. 22, 2010. This application also claims the benefit of U.S. Provisional Application No. 61/672,825, filed Jul. 18, 2012. All applications are herein incorporated by reference in their entirety for all purposes.

FIELD OF THE INVENTION

The invention is related to the field of valve actuators and other rotary control devices, and more particularly to an electronically controlled, motorized valve actuator for adapting manually operated valves and rotary control devices to automated operation.

BACKGROUND OF THE INVENTION

Replacing a manually controlled valve with an electronically controlled valve typically requires closing and draining that section of the pipeline or conduit, removal of the manual valve and installation of an expensive valve in an existing water, gas or fluid supply conduit, as well as providing a power source, for example pneumatic or electric power, and the associated control circuitry. In most cases, this requires a plumber and/or other skilled tradesmen to do the installation. The cost of installation may exceed the cost of the valve itself. A method and apparatus to easily and inexpensively convert a manually controlled valve for an automatic operation, while retaining the ability to easily revert to manual operation, would be a useful and valuable solution in many situations.

In response to this need, a device that can be added inexpensively and easily to shut off the water supply to a property or to an appliance located at the property and can be controlled to shut off the water under a variety of conditions was developed and is disclosed in U.S. Pat. No. 6,701,951 B1 to Drinkwater.

There are various other designs and implementations for automatically controlling various manual shut-off valves, varying in cost and complexity. However, what is needed is a valve actuator system that is more easily adapted to existing manual valves without interrupting plumbing connections, configurable to effectively cause or produce a valve control action such as a shut-down or shut-off action upon the occurrence of a specific event or condition, and capable of running on battery power for long periods of time without attention.

SUMMARY OF THE INVENTION

It is a goal of the invention to provide an easy and inexpensive way to convert a variety of standard, off-the-shelf manually operated valves and rotary control devices, including but not limited to ball valves, gate valves and air flow dampers, into electronically controlled valves. According to one aspect of the invention, there is an electronic valve actuator system or kit which is scalable in design and adaptable to various types and sizes of valves including inlet, in-line and outlet valves installed in a fluid flow conduit, such as, for example, a pipeline. It may be installed so as to terminate a conduit or pipeline and function as a faucet, such as for a water supply line connected thereafter by a host to a washing machine The terms "pipe," "pipeline," "conduit," and "fluid flow conduit" may be used interchangeably throughout this specification.

The term "fluid" is here intended to include any non-solid or flowable material that in its operative state or phase is commonly contained within and transported through an enclosed conduit system of any type, where valves, dampers or other flow control devices are employed to open, close, restrict, route or otherwise control the material flow within the conduit. Such conduits and manual control valves to which the invention is directed may be found in stationary settings such as residential or industrial facilities or other buildings or facilities of all kinds, or in mobile settings such as on aircraft, ships, or land vehicles, including recreational vehicles.

For example, a valve actuator system or kit of the invention may be coupled to a manual shut-off valve in a manner that provides for mechanized or motorized operation of the valve from one setting to another, such as from full on to full off, automatically upon the occurrence of a specific event or condition by means of a triggering mechanism and/or sensor system connected to a motor control circuit. The valve motor may be supported by its drive shaft, which is attached by a handle adaptor to the valve handle. Motor rotation in a direction opposite intended shaft rotation is prevented or sufficiently restrained by positional interference, directly or indirectly, with a reference point proximate the valve, fixed with respect to the orientation of the valve body, such that operation of the motor primarily causes drive shaft rotation, resulting in valve handle and valve stem rotation. Valve stem rotation between full on and full off is in some manual valves such as common ball valves, be a simple one-quarter turn. In other valves, such as common gate valves, it may require multiple turns. There may be some motor movement and partial counter-rotation about its drive shaft with respect to the reference point when the motor is operated and torque is applied to the valve handle. But after the torque applied to the drive shaft by the motor exceeds that necessary to consume the "slack" in the counter-rotation mechanism, a rotation will be induced in the valve handle and stem, so as to operate the valve.

In another aspect, an electronically controlled, spring or motor actuator system coupled to a manual valve may be configured to make the valve responsive to a variety of conditions, such as the presence of water at a location normally dry, using appropriate sensors and/or switches or computer connections which may be positioned locally or remotely. Either or both the actuator and the sensors may be accessible and controllable via internet monitoring or telephone or wireless means. Other conditions that might be used to set or trigger an automatic valve actuation include but are not limited to: sound or motion; humidity or temperature, e.g. thermal stress or fire alarm; the presence of selected gases in the air, e.g. carbon monoxide detector; exhaustion of a fuel supply, e.g. heating system fuel depletion; and automated or manually executed commands from a computer or other network device to which the actuator system is electronically connected.

In yet another aspect of the invention there is provided a flexible anti-rotation structure or mechanism extended between the valve actuator or motor and a fixed rotational reference point such as a bracket mounted on the conduit or valve body or nearby wall or support structure, such that when the valve actuator or motor is properly mounted on and supported by the valve handle, the valve actuator and manual valve operate together as a powered valve regardless of the various type and operating position and range of shaft translation and rotation of the knob, handle or lever of the manual valve. This flexible, or less than rigid, connection of the anti-rotation coupling mechanism between the motor and the fixed anti-rotation reference point, which may operation in tension, compression, shear, bend, or any combination to resist motor counter rotation, also allows the valve actuator to tolerate a limited initial degree or of motor counter-rotation. Initial motor counter-rotation upon motor start is typically less than one quarter turn (90 degrees) in most installations and not more than one half turn (180 degrees) in any installation, before the anti-rotation coupling mechanism is fully effective, motor counter-rotation is fully arrested, and sufficient torque is available to operate the valve.

In a further aspect of the invention there is provided a mounting structure and method such that the motor-actuator system can be installed easily on a manual valve assembly, without having to open the line or remove the valve handle or otherwise disassemble the valve.

In another aspect, there may be valve handle adapters fitted to or compatible with specific valve handles and drive shafts for providing non-rotational engagement of the shaft with valve handles of various geometries and adequate support for the motor or valve actuator mechanism.

In yet another aspect of the invention the motor may be electric, pneumatic or spring powered, and capable of generating rotational or linear motion convertible to rotational motion for shaft operation. Electrical power may be provided by line, solar, or battery power, as well as through electromagnetic coupling, induction, or any other means or source. There may be included a self-contained power supply, such as a battery and/or compressed air cartridge, so that the actuator, and if so configured, a related sensor system, can function independently of, or alternatively as a backup to, traditional or common power sources. A spring-actuated motor may include means for rewinding or resetting, after a valve-operating event has occurred. These means may require manual intervention by the user, or be further automated.

A still further aspect of the invention provides for a flexible or non-rigid relationship of the components of the invention to the valve handle to which they are mounted, and the anti-rotation fixed reference point to which they are connected, such that the stress introduced by slight mis-alignment is distributed and accommodated to some extent by minor realignment or responsive movement of the actuator system components with respect to the valve handle and stem.

An additional aspect of the invention provides for selecting from among different valve handle adapters including engagement fork and adaptor designs to accommodate different styles of valve handles.

An additional aspect of the invention provides for a quick-release or quick-disconnect capability that allows for easy and efficient removal of the assembly from the valve handle, thus permitting access for manual control of the valve in a traditional manner. This may be useful in the event of an actuator failure or the occurrence of unforeseen conditions requiring intervention.

In yet another aspect of the invention, the motor control circuit conserves battery life by providing electrical power to certain parts of the circuit only when the motor is running.

In yet another aspect of the invention, gripping disks may be secured above and below the valve handle with mechanical fasteners, or an equivalent, such that the disks are attached to each other, sandwiching the valve handle between them, and rotational motion induced in such disks results in concurrent rotational motion in the valve handle. In this configuration, the upper disk is attached to, and provides support for, the motor shaft and motor or motor assembly.

Embodiments described in the next section and other examples of these concepts within the scope of the appended claims include, but are not limited to, powered actuator systems and methods of installation and use to provide for automating the operation of valves normally operated by hand.

For example, there is a method for installing and using a powered valve actuator for operating a manual valve having a valve handle affixed to a valve stem extending from a valve body installed in a fluid flow conduit, the method comprising the steps of engaging a valve handle adapter mounted on one end of a drive shaft with the valve handle whereby the actuator shaft is substantially axially aligned with the valve stem and rotation of the drive shaft results in concurrent rotation of the valve handle, slidingly engaging the open ended drive chuck or rotatable yoke of a motor assembly over the other end of the drive shaft into an axially slideable but non-rotational fitment with the drive shaft, and connecting the motor assembly by an anti-rotation mechanism to the fluid flow conduit whereby operation of a motor within the motor assembly rotates the actuator shaft and hence the valve handle. The drive shaft may be square or hexogonal or fluted or keyed or otherwise configured to affect its slidable but non-rotational fitment within the rotating chuck or yoke of the motor.

Some embodiments utilize a fastener, such as a cotter pin, to secure the drive shaft and motor assembly to one another after they are slidingly engaged. Other embodiments may utilize a set screw, clamp, or other locking means to secure the shaft from rotation and longitudinal displacement within the motor chuck or yoke after the motor is in place on the shaft.

The valve handle adapter may have a first adapter plate attached to one end of the drive shaft perpendicular to the drive shaft axis, and a mating adapter plate configured so as to be fitted beneath the valve handle into alignment with the first adapter plate, and fasteners suitable for fastening the two adapter plates together whereby engaging the valve handle captures the valve handle in a non-rotating relationship between the two adapter plates. The valve handle adapter may in other cases have at least one tine or prong extending from the drive shaft for engaging the valve handle, where the tines go through the plane of the valve handle, within its circumference, so that rotation of the actuator shaft places the tines in contact with the valve handle, causing concurrent rotation of the valve handle.

In another case, the motor assembly may have a motor assembly configured to accept axial insertion of a drive shaft. There may be a housing configured to cover and contain the motor and/or a reduction or multiplier gearbox. There may further be an anti-rotation rod, strap, or other mechanism, extending from a point on the housing or motor parallel to, but displaced from, the drive shaft, into a counter rotationally (with respect to drive shaft rotation induced by the motor assembly) interfering relationship with the conduit or with a bracket attached to the conduit proximate the valve body or to the valve body directly. The motor or housing may be readily detached if required, for immediate manual access to the valve handle.

In another example, a valve actuator system includes a DC motor, a battery, and a motor control circuit by which the motor can be energized by the battery. A sensor positioned in a desired location is linked to the motor control circuit for monitoring for a select condition or triggering event for which a valve adjustment would be appropriate. Upon the occurrence of the select condition, the motor control circuit is activated, thereby energizing the motor to rotate the valve handle. The motor control circuit may include a motor control circuit condition monitoring sub-circuit, such as monitoring of current draw of the motor, and a power regulator configured to set a power consumption level of or voltage for the monitoring sub-circuit in response to a state of the sensed condition, so the power consumption level of the monitoring sub-circuit is one of a plurality of power consumption levels and the state of the sensed condition is one of a plurality of states. In a simple case, such as when the system is battery powered, the monitoring sub-circuit operates at one power level when the motor is being driven and operates at a reduced power level when the motor is idle, thereby saving battery power.

The term "motor" for purposes of the specification and claims is intended to extend where context admits to motor assemblies comprising a primary motor and integral gearbox and housing where the combination is intended to operate an output shaft. The term "valve" extends for purposes of the specification and claims to all manner of rotary based, manually operated, mechanical and electrical control switches and devices, whether proportional, make/break, sliding contacts or rheostats, as may be installed in fluid flow circuits, electrical circuits, or mechanical linkages or machines, and mounted for support on pipelines, on control panels or in other fixed positions or surfaces proximate the device, where the operative shaft is terminated at one end by a handle, knob, or other control intended for operation by manual rotation. All other terms and descriptions used herein will have analogous meanings in applications alternative but equivalent to those utilized below as illustrative of the invention, which are readily apparent to those skilled in the art, and are intended to be within the scope of the appended claims.

This, and other goals and objectives of the invention, may be achieved by an electronically controlled valve actuator device that is easily mounted to and mated with an existing manually controlled valve and handle or other control intended for operation by manual operation. In its mounted or coupled position on a manual valve, the actuator system motor or motor housing may be configured such that the drive shaft is attached to the valve handle and oriented above and substantially co-axially to the valve stem. A housing, if present, may hold the motor in a floating or semi-floating, non-rotational relationship. The motor, or housing if present, is secured from excessive counter rotation by connection to a fixed reference point, which may be a bracket secured to the conduit or valve body or other nearby structure so that torque may be applied to the valve handle via the drive shaft and valve handle. Provision is required for power for the motor and motor control circuit and may be in the form of an internal or external, dedicated or shared power source. The power source may be in a stored energy, such as a battery or compressed air cartridge, or line energy form, such as an electrical or pneumatic connection to a suitable source. The use of a spring, such as a coil spring, in combination with a gear set or otherwise, wherein the release of the spring is controlled by a motor control circuit, such as a solenoid or other spring release or trip mechanism is also contemplated by this invention.

The motor control circuit board may control the motor direction and torque, based on the signal from the sensor system, switches, or other local or remote control such that the motor can operate the valve on or off or otherwise modulate the fluid flow through the valve.

Motor torque may be preset or adjustable. Torque will typically be set to a maximum value greater than the maximum valve handle resistance to rotation and less than the valve stop structural limits, in order to avoid damage to the valve. The motor control circuit and actuator motor may provide for a simple on/off valve operation, rotating the valve handle from the open stop to the closed stop, or it may provide for adjustable flow control by timed or stepped range valve operation. Further, it may be incorporated into a process control loop using a sensor system and feedback signal for dynamic valve operation and flow control in the fluid conduit.

Repetitive cycles of valve operation by a device of the invention is not a requirement of all embodiments; embodiments capable of easy attachment to a manual valve and of enduring long standby periods while still providing one reliable valve open or closure cycle upon the occurrence of an exceptional or trigger event, such as detection of a probable water or fluid leak, are very useful devices, and within the scope of the invention. Such embodiments may require any or all of removal, a manual reset and testing of the sensor and spring trip or motor drive mechanism, and remounting on the valve in order to be restored to service.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The invention is susceptible of many embodiments and variations. What is described here is illustrative, but not limiting, of the scope of the invention.

Figure 1:
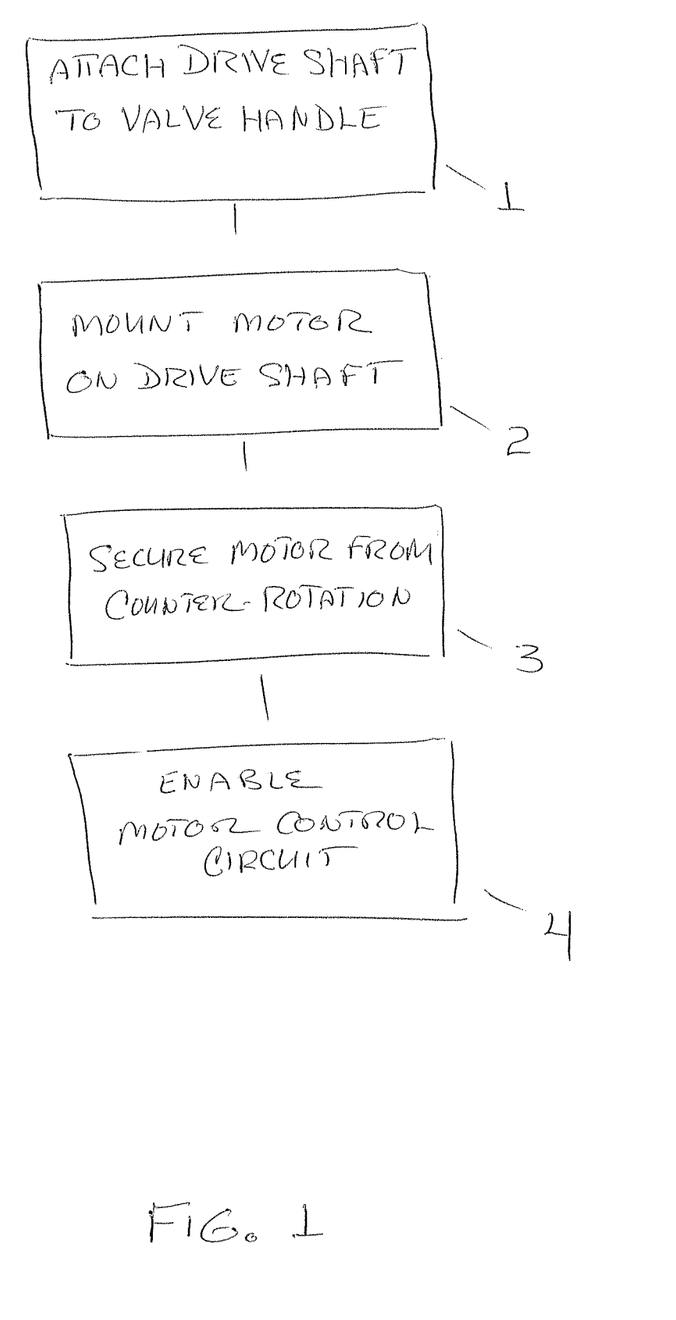
FIG. 1 is a flow chart of a methodology of the invention whereby the drive shaft is attached to the handle of a manual valve, the motor is mounted on and supported by the drive shaft, the motor is secured from counter-rotation, and the motor control circuit is enabled.

Referring to FIG. 1, the basic steps of one embodiment of the method of invention are illustrated. Step 1, "Attach drive shaft to handle", refers to the configuring a valve handle 206 with a drive shaft 104, by the use of such suitable adaptors 106 and fasteners as may be required, so that when the valve handle 206 is properly mounted on the valve stem 204, the drive shaft 104 is axially aligned with the valve stem 204 but extends away from the valve 200, and is sufficiently well attached to support an actuator motor or motor assembly 102.

The terms actuator, motor, motor stator, motor assembly, and motor housing are used interchangeably throughout the specification and claims in so far as context admits. These terms are also meant to incorporate, in so far as context admits, any associated gear reduction means or mechanism, such as, but not limited to, a gear-box, employed between the motor and the drive shaft 104.

It should also be noted that the orientation of valves 200 to which the invention applies, in particular the valve stem 204 axis and perpendicular plane of valve handle 206 rotation, are unimportant. For example, in the case of an air damper, it is common for the valve stem 204 axis to be horizontal. In the case of valves 200 in pipelines, it is common, although far from universal, to orient the valve 200 such that the valve stem 204 axis is vertical. The invention is equally applicable in all cases, assuming sufficient space is available in the region of the valve handle 206 to allow mounting of the valve actuator 100.

Step 2, "Mount motor on drive shaft", refers to mating the motor drive hub to the drive shaft 104 so that the motor 102 weight is supported by the drive shaft 104 and hence by the valve handle 206, and so that the motor 102, when energized by its motor control circuit, applies rotational torque to the drive shaft 104 and hence to the valve handle 206.

In addition to merely having its weight supported, the motor 102 must also be braced with respect to the valve body 202 in order to provide the necessary torque via the drive shaft 104 and valve handle 206 to overcome the inherent internal resistance of the valve to rotational operation. The valve body 202 is, for all purposes herein, assumed to be held in a stationary or fixed position with respect to the conduit 300 and the immediate environment in which it is installed.

With respect Step 3, "Secure motor from counter-rotation" refers to the requirement to provide means to keep the motor 102 from counter-rotating, or rotating opposite the direction of applied motor 102 torque. In accordance with the invention, Step 3 requires the motor or motor housing 102 be connected to a stationary or fixed reference point in a manner suitable for resisting excessive counter-rotation by the motor 102 when operated. The reference point is typically defined by slot 114 of conduit bracket 116. It is important to note that, assuming the motor 102 has rotational range well in excess of the rotational range of the valve 200 or switch handle 206, it is not necessary to restrict the motor from any and all counter-rotation. In many instances, a limited degree of flexibility, ranging from 5-25 degrees of rotation will be desirable. For example, the motor 102 may be secured by connection or attachment via an anti-rotation structure 116 to the conduit 300 or other fixed reference point within the immediate environment that allows counter-rotation of the motor 102 within the limits of any physical clearances and electrical connections 108, such as less than a full 360 degree turn, or preferably less than 180 degrees, up to the point at which its resistance to counter rotation equals the internal valve 200 resistance to rotation, and the motor 102 rotates the valve handle 206. In some embodiments, accommodation of limited counter rotation can occur in both directions, such as might be required for embodiments designed to both open and close a valve 200.

For purposes of the specification and claims, the terms "anti-rotation" and "counter-rotation" with respect to the motor 102 are similar but distinct. Where context requires, "counter-rotation" refers specifically to a direction opposite the intended rotation of the valve handle 206; and "anti-rotation" refers more generally to resisting counter rotation of the motor 102 in either direction.

The anti-rotation structure of the invention may be any of limitless designs. One illustrative embodiment is a flexible or rigid tension member or strap one end of which is attached or bearing on the motor 102 for leverage at a point spaced apart from the axis of rotation and the other end connected to a fixed point in or proximate to the plane of motor rotation so as to resist further motor 102 rotation when fully extended in tension. The strap may be a lever or linkage of any sort, configured to provide or include this anti-rotation functionality.

Another embodiment representative of the Step 3 requirement may employ a rigid rod 110 extending from a point on the motor 102 spaced apart from the hub or rotational axis and extending from the plane of motor 102 rotation toward the conduit 300 where the conduit 300 or a bracket 116 attached to it functions as a fixed point to resist rotation of the rigid rod 110 about the valve 200 axis when counter rotation brings the rod 110 into contact with it. The rod 110 must be strong enough to absorb the bending moment required to counteract the torque from the plane of motor 102 rotation to the conduit 300. The rod 110 in some embodiments may run loosely through an enlarged open slot 114 in the bracket 116 in order to accommodate some twisting or deformation in the plane of motor 102 rotation as the motor 102 applies torque to the valve handle 206 until the rotational and counter rotation forces are balanced and the valve handle 206 is forced to rotate through its normal range of motion.

In all cases hereunder, the function of the anti-rotation or counter-rotation mechanism is directed less at any significant weight bearing function with respect to the motor 102, and more at resisting or limiting motor 102 rotation opposite the intended direction of valve handle 206 rotation. The weight of the motor assembly 102 is primarily borne by the valve handle 206 through the adaptors 106 and drive shaft 104.

Step 4, "Enable motor control circuit" refers to the final step of enabling the automated operation of the valve 200 by the actuator 100 upon the occurrence of the selected condition or criteria. In some embodiments this may include electrical power and computer control. Others may use alternative forms of power including compressed air, magnetism, spring, or other, and alternative control mechanisms as simple as one condition or on/off sensors, or analog sensors requiring proportional control in one or both directions. Keyboards, microphones and manual switches are also contemplated as possible control mechanisms. The control variables may be one or a combination of any measurable parameter, whether environmental, biological, electrical, industrial, or otherwise, or simply an operator input such as a selection on a keypad or a voice command. The sensor and automated flow control may in combination form a feedback loop in some embodiments whereby a desired equilibrium or disequilibrium of output or effect is established or maintained.

Figure 2:
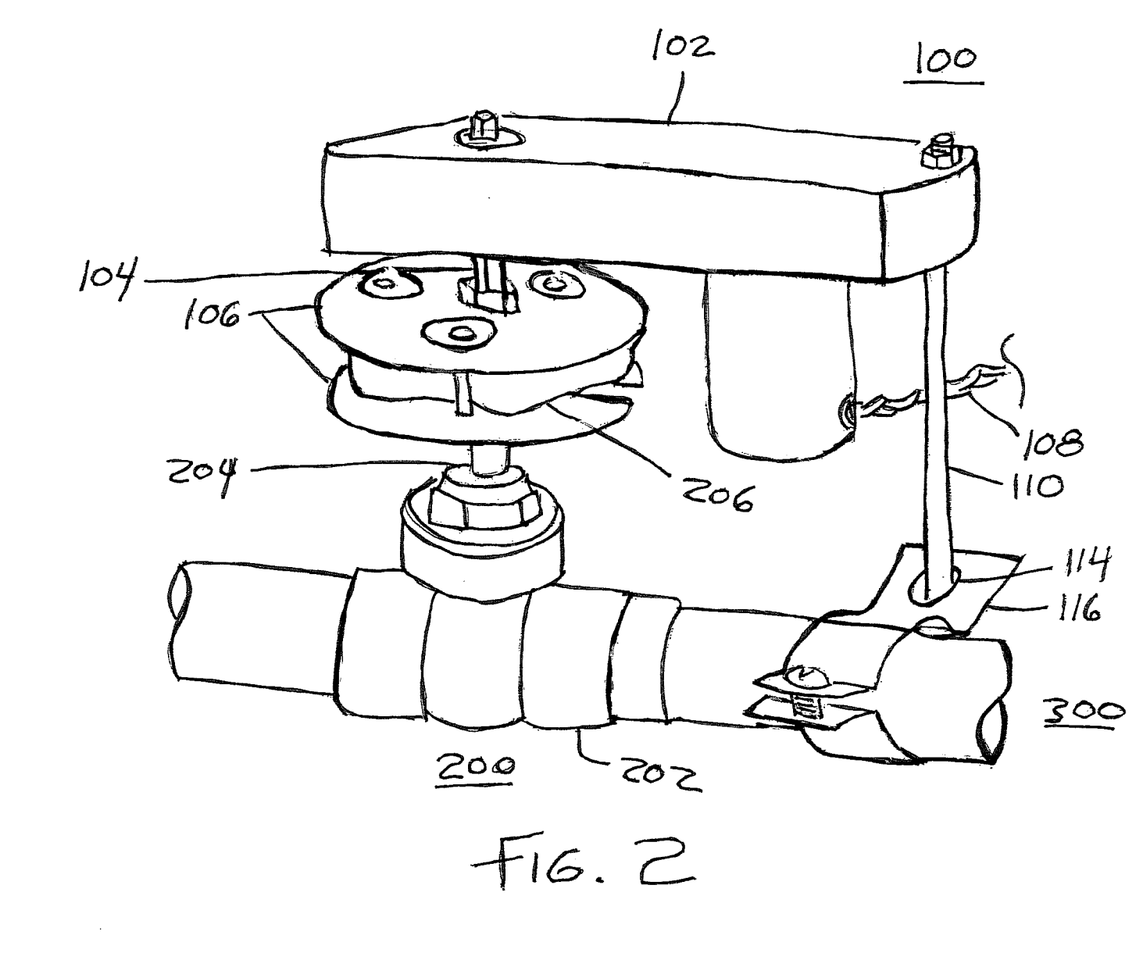
FIG. 2 is a perspective view of one embodiment of the invention mounted to a gate valve, with the drive shaft attached by adapter plates to the valve handle, the motor assembly comprising a motor and a gear box mounted on and supported by the drive shaft, the motor assembly secured against rotation by a rod extending from an outboard end of the motor assembly through a slot in a bracket secured to the conduit, with electrical leads extending from the motor leading to a motor control circuit, power source, and remote sensor.
Figure 3:
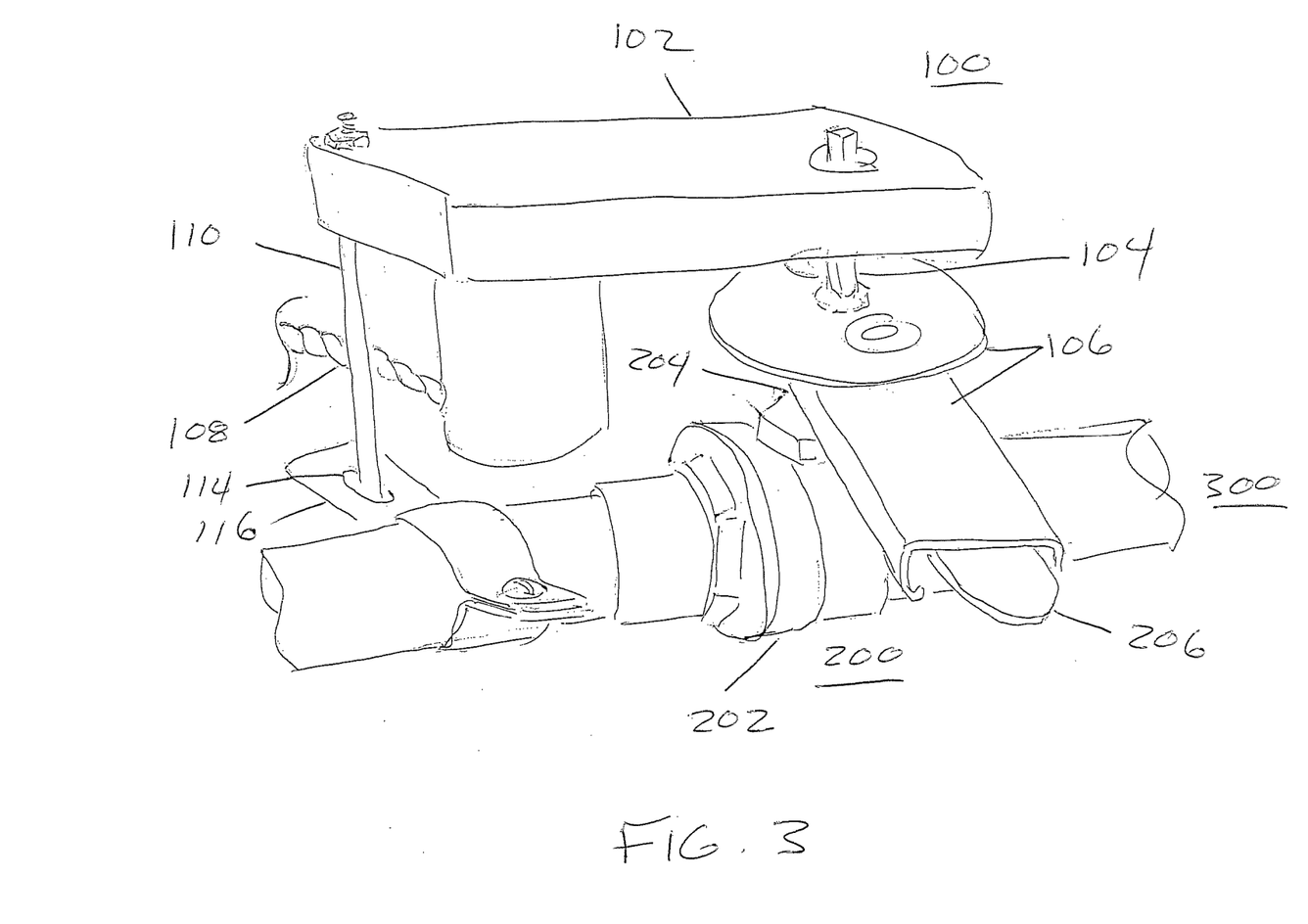
FIG. 3 is a perspective view of one embodiment of the invention mounted to a ball valve, with the drive shaft attached by adapter plates to the valve handle, the motor assembly comprising a motor and a gear box mounted on and supported by the drive shaft, the motor assembly secured against rotation by a rod extending from an outboard end of the motor assembly through a slot in a bracket secured to the conduit, and electrical leads extending from the motor, leading to a motor control circuit, power source and remote sensor.
Figure 4:
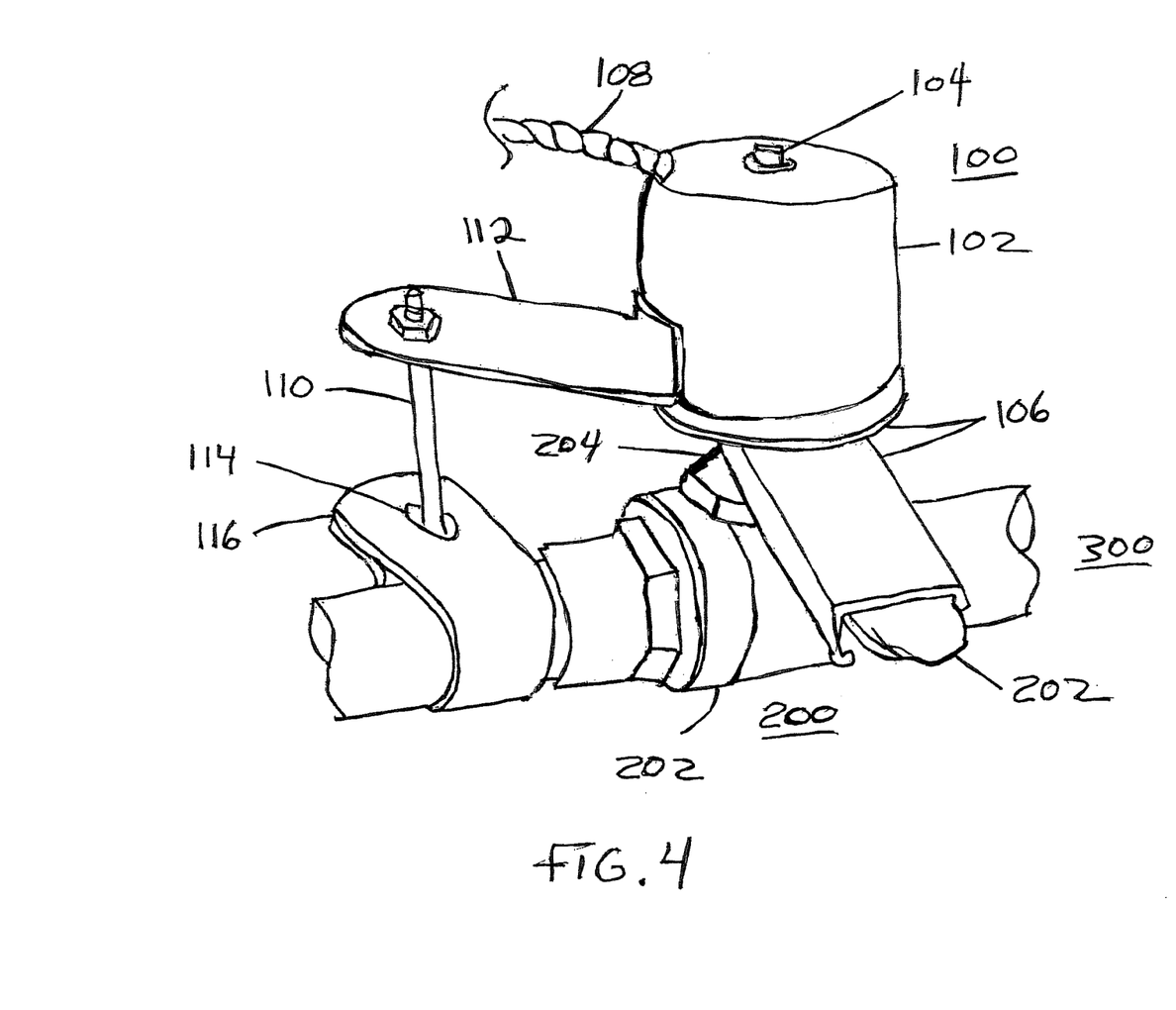
FIG. 4 is a perspective view of one embodiment of the invention mounted to a ball valve, with the drive shaft attached by adapter plates to the valve handle, the motor assembly comprising a motor and a gear box mounted on and supported by the drive shaft, the motor assembly secured against rotation by a rod extending from a bracket fixed to and extending radially outward from the motor assembly through a slot in a bracket secured to the conduit, and electrical leads extending from the motor, leading to a motor control circuit, power source and remote sensor.

Referring to FIGS. 2-4, there are illustrated three embodiments of the invention. FIG. 2 shows an installation on a gate valve 206, FIGS. 3 and 4 show installations on a ball valve 206. In all three of these figures, an electronically controlled valve actuator 100 consisting of a motor assembly 102, drive shaft 104, adaptor plates 106, and leads 108 extending from the motor assembly 102 to a motor control circuit, power source, and remote sensor (not shown but well understood to those skilled in the art). Valve 200 on which the actuator is installed, consists of valve body 202 installed in conduit 300, valve stem 204 extending from the valve body, and valve handle 206 affixed to the valve stem 204 by which the valve 200 is normally operated by manual rotation in the required direction to control fluid flow in the conduit 300. In one aspect of the invention drive shaft 104 is attached by adaptor plates 106 to valve handle 206 with the drive shaft 104 substantially axially aligned above the valve handle 206 with valve stem 204 to which the valve handle 206 is attached. Drive shaft 104 is attached via adaptor plates 106 with sufficient rigidity to support the weight of motor assembly 102 mounted thereon.

Actuator 100 in these examples further includes a counter-rotation restraint mechanism in the form of rod 110, which may be a stud, bolt, or other object, extending from motor assembly 102, or from a bracket 112 attached to the motor assembly as in FIG. 4, the other end of which extends into slot 114 of clamp 116 secured to conduit 300. Alternatively, a bracket with elongated mounting holes, extending substantially perpendicularly to the conduit 300 and attached to such conduit by U-bolts, and having an aperture for receiving rod 110, could be used to secure the rod 110. This embodiment provides for enhanced adjustability of the restraint mechanism during installation. In both embodiments, actuator 100 is mounted on valve 200, normally manually operated, to provide automated valve operation affecting fluid flow through conduit 300 upon the occurrence of a trigger event detected by the sensor of actuator 100. The counter-rotation components limit counter-rotation and enable the actuator to apply rotational torque to drive shaft 104 sufficient to operate valve 200.

Adaptor plates 106 and suitable fasteners, such as bolts or studs, attach drive shaft 104, to valve handle 206 so that drive shaft 104 is supported as a substantially axially aligned extension of valve stem 204, extending from handle 206 away from valve body 202. Motor assembly 102 is installed on and supported by drive shaft 104. Motor assembly 102 is thereby operatively coupled to valve handle 206.

Motor assembly 102 is secured against excessive counter-rotation by rod 110 extending from motor assembly 102, or as in FIG. 4 a motor bracket 112, parallel to valve stem 204. The rod 110 is secured to the conduit 300 by either extending through slot 114 of conduit bracket 116 or by securing rod 110 to an aperture in a mounting bracket with substantially elongated holes, such holes aligned substantially perpendicularly to the conduit 300 flow, such bracket secured to the conduit via U-bolts operatively engaged with such elongated holes. The latter arrangement allows for enhanced adjustability during installation in the axis perpendicular to the conduit flow.

Devices to which the invention is applicable include ball valves, gate valves, air duct dampers and other or any valve type or manually operated fluid flow control or rotary based electrical or mechanical control device having a valve stem 204 or central operating shaft with a stem or shaft end mounted handle 206 by which it is normally manually operated. Variations of this and other embodiments of the invention provide for powered operation of valves 200 or rotary based control devices that may require anywhere from a small fraction of a full turn up to multiple turns of rotation of the manual valve stem 204 to go from valve stop, e.g. full open, to opposing valve stop, e.g. fully closed. Any required electronic circuitry and/or a power supply such as a battery may be packaged or housed separately from the actuator motor while connected by a suitable wiring harness 108, and be positioned nearby but not necessarily in the same housing with the motor. The motor housing 102 may be limited to a simple motor support bracket or assembly and appropriate adaptors 106.

Figure 5:
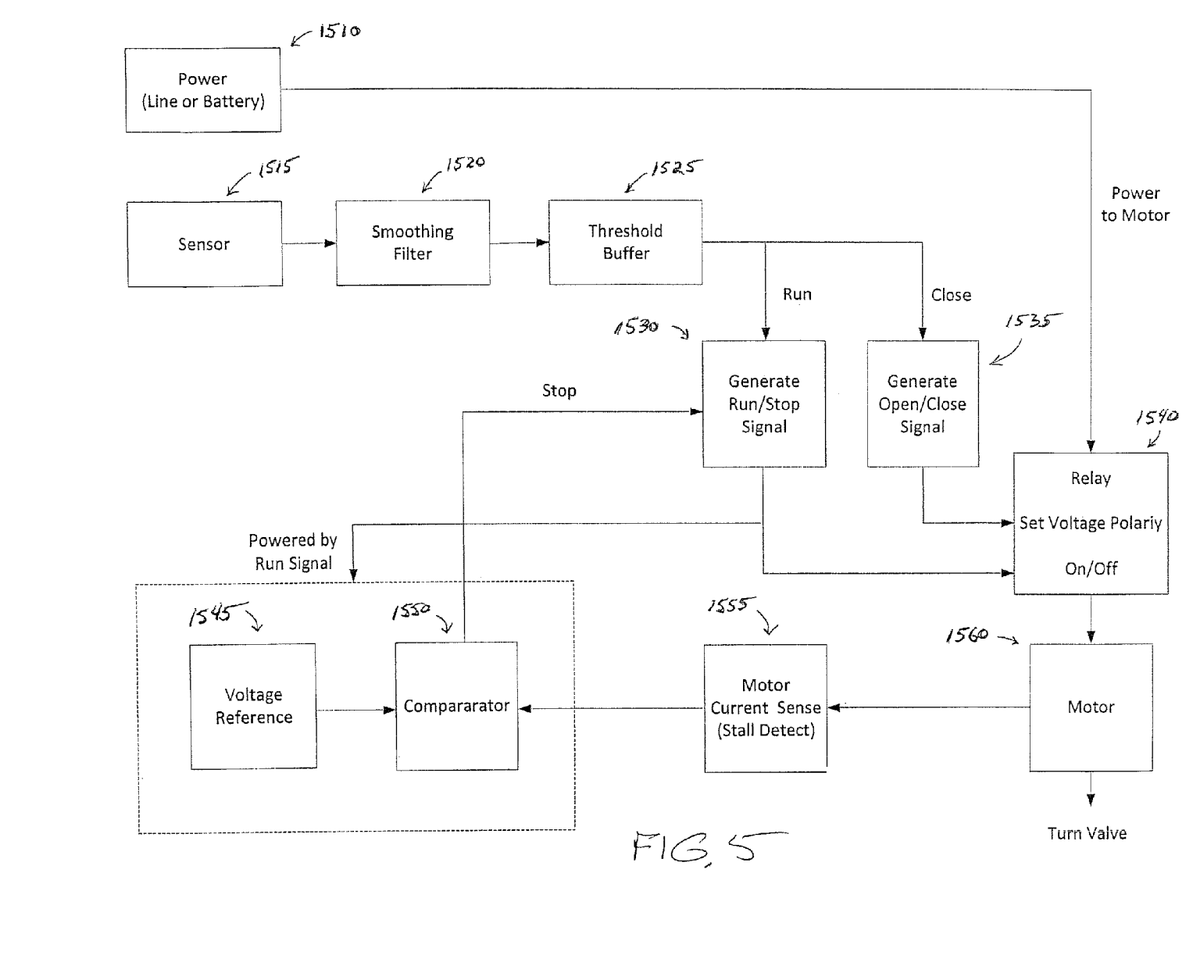
FIG. 5 is a block diagram of an embodiment of a motor control circuit with a condition monitoring sub-circuit.

Referring now to FIG. 5 there is shown a block diagram of the motor control circuit according to an embodiment of the invention. A power supply 1510 is provided. Power may be available from several sources including a nominal 12-volt DC input derived from an AC utility line, a nominal 9-volt DC battery, seven AAA batteries, a plurality of batteries, or any other suitable power source. The battery may be required to operate parts of the circuit for long periods of time, perhaps years, in the event that other power sources are not available. Line voltage may also be used in conjunction with stored energy power sources to extend the lifetime of the stored energy power source(s) while maintaining the ability to operate during times when line power is unavailable. These named potential power sources are not exhaustive, as will be apparent to one skilled in the art.

A sensor 1515 is provided to detect abnormal conditions that might require the closing or opening of a valve 200. The sensor 1515 may be a moisture sensor, in some embodiments. A plurality of sensors 1515 may also be utilized to monitor for the presence of multiple conditions, to monitor multiple areas for a particular condition, or to monitor multiple areas for multiple conditions.

A smoothing filter 1520 is provided to filter out noise and switch bounce, which may be present in the output of the sensor 1515. In some embodiments the filter may have a time constant of approximately 0.47 seconds. A threshold buffer 1525 is provided to convert the output of the smoothing filter 1520 into a step logic transition to drive the control logic elements in the circuit. The threshold buffer 1525 may be a non-inverting buffer with hysteresis, sometimes referred to as a "Schmitt Trigger". The threshold buffer 1525 may draw essentially no current under steady state conditions, helping to keep stored energy usage to a minimum and extend the service interval of the valve actuator 100.

The output of the threshold buffer 1525 is fed to a logic module 1530 that generates a "run" signal in response to detection of a preselected condition by the sensor 1515. The output of the threshold buffer 1525 is also fed to a logic module 1535 that generates an "open" or "close" signal, as appropriate, in response to detection of the preselected condition by the sensor 1515. The "run" signal is fed to the on/off input of relay 1540 to turn the relay on. The "open" or "close" signal is fed to the voltage polarity input of relay 1540 to cause the relay output voltage polarity to drive the motor 1560 in the open or close direction, thus turning the valve such that it opens or closes, as appropriate.

Relay 1540 may be implemented as an electromechanical device or as an electronic device, which may comprise power transistors or other suitable means for control.

When the valve reaches the fully open or closed position, motor 1560 will stall, resulting in an increased current load. Motor current sense unit 1555 monitors the current drawn by motor 1560 and provides a voltage output proportional to the current draw. This voltage output is fed to comparator 1550 where is compared to a preset voltage reference 1545. When the voltage exceeds the reference, it is determined that the motor 1560 has stalled and the comparator 1550 generates a stop signal which is fed to the logic module 1530 which then turns relay 1540 off, halting the motor 1560.

Comparator 1550 and voltage reference 1545 typically draw very large currents relative to the other components of the motor control circuit and therefore use up the vast majority of the power that is supplied to the circuit. Comparator 1550 and voltage reference 1545, however, only serve a useful function while the motor 1560 is running, in response to the preselected condition, which is expected to be a rare event. In some embodiments, therefore, comparator 1550 and voltage reference 1545 may be powered by the "run" signal, or an equivalent, resulting in significant power savings and extension of battery life. Thus, the motor control circuit operates at one power level when the motor 1560 is being driven and operates at a substantially reduced power level when the motor 1560 is idle, allowing the valve actuator 100 to remain ready to respond to the preselected condition(s), without service, for a period of months or even years.

In some further embodiments, the motor control circuit may include manual override switches, or momentary contact switches, to drive the "run/stop" signal and the "open/close" signal. This would provide an additional degree of control over the motor 1560 independent of the presence of the preselected condition(s).

The motor control circuit, as described, is not limited in application to opening and closing valves 200 in response to preselected sensor conditions, such as moisture. The motor control circuit can be used to control any type of power driven device based on any type of control input. Furthermore, the power saving features described above can be used to advantage whenever there is a need for intermittent operation of a device to be run on battery power. In addition to extending battery life, the circuit described above may be useful in any application where power savings are desired.

The motor control circuit may be more generally described as a condition monitoring circuit that is continuously operating, but which consumes varying levels of power depending on the state of the monitored condition. Furthermore, the number of possible condition states is not limited to two, but may be any number. The number of possible power consumption levels is similarly unconstrained and may equal the number of condition states.

Other and various embodiments and examples are within the scope of the invention. For example there is a method for installing and using a powered valve actuator for operating a manual valve having a valve handle affixed to a valve stem extending from a valve body installed in or terminating a conduit, wherein the powered valve actuator consists of a valve handle adaptor, a drive shaft, a motor, an anti-rotation member, and a motor control circuit. The steps include engaging the drive shaft and valve handle adapter with the valve handle of the manual valve whereby the drive shaft is substantially axially aligned with the valve stem and supported by the valve handle, and rotation of the drive shaft causes concurrent rotation of the valve handle, operating the valve; engaging a motor with the drive shaft whereby the motor is supported by the drive shaft and will rotate the drive shaft when energized; securing the motor against rotation with respect to the valve body with the anti-rotation member whereby operation of the motor applies rotational torque to the drive shaft and hence to the valve handle with respect to the valve body; and enabling the motor control circuit.

Securing the motor against rotation with respect to the valve body may consist of connecting the motor to a fixed reference point with the anti-rotation member whereby rotational force is resisted through the anti-rotation member by the fixed reference point so that rotational force is transmitted to the drive shaft.

Connecting the motor to a fixed reference point with the anti-rotation member may consist of affixing a rod to the motor at a point spaced apart from the drive shaft and extending substantially parallel to the drive shaft towards the conduit whereby the conduit interferes with counter rotation of the rod and motor about the drive shaft when said motor is operated.

Connecting the motor to a fixed reference point using the anti-rotation member may further consist of installing a restraining clamp on the conduit and receiving a distal end of the rod in a hole therein whereby rotation of the rod and motor about the drive shaft is restrained.

As another example, there is a valve actuator system for automating the operation of a valve with a valve stem and valve handle, installed in or terminating a conduit, consisting of: a drive shaft attached to a valve handle adapter configured for attachment to the valve handle whereby the drive shaft is in substantially axial alignment with the valve stem and supported by the valve handle; a motor supported by the drive shaft; an anti-rotation member connecting the motor to a fixed reference point; a power source; a motor control circuit by which the power source may be connected to the motor; and a signal input to the motor control circuit whereupon the occurrence of a signal at the signal input triggers a motor operation.

The anti-rotation member may consist of a rod fixed to and extending from the motor at a point offset from the drive shaft, oriented substantially parallel to the drive shaft, extending into a slot in a bracket secured to the conduit or valve body, whereby rotation of the motor is resisted.

The anti-rotation member may consist of a tension member or strap, rigid or flexible, fixed to and extending from the motor at a point displaced or offset laterally from the drive shaft for leverage, oriented substantially perpendicular to the drive shaft and attached to a reference point fixed in space with respect to the valve body, whereby rotation of the motor is resisted.

The anti-rotation member may consist of a rod and a plate, the rod fixed to and extending from the motor at a point offset laterally from the drive shaft for leverage and oriented substantially parallel to the drive shaft, the plate being attached to the conduit or other reference point fixed in space with respect to the valve body by use of fasteners, in a plane perpendicular to the drive shaft and configured with an aperture which might be an opening or slot or channel or such capable of receiving and laterally containing the distal end of the rod, whereby rotation of the motor is resisted.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

What is claimed is:

1. A method for installing and using a powered valve actuator for operating a manual valve having a valve handle affixed to a valve stem extending from a valve body installed in or terminating a conduit, wherein said powered valve actuator comprises a valve handle adaptor, a drive shaft, a floating motor, an anti-rotation member, and a motor control circuit, said method comprising:

engaging said drive shaft and valve handle adapter with said valve handle of said manual valve whereby said drive shaft is substantially axially aligned with said valve stem and supported by said valve handle, and rotation of said drive shaft causes concurrent rotation of said valve handle, operating said valve;

engaging said motor with said drive shaft whereby said motor is supported by said drive shaft and will rotate said drive shaft when energized;

securing said motor against rotation with respect to said valve body with said anti-rotation member whereby operation of said motor applies rotational torque to said drive shaft and hence to said valve handle with respect to said valve body; and enabling said motor control circuit.

2. The method of claim 1, wherein securing said motor against rotation with respect to said valve body comprises connecting said motor to a fixed reference point with said anti-rotation member whereby rotational force is resisted through said anti-rotation member by said fixed reference point and rotational force is transmitted to said drive shaft.

3. The method of claim 2, wherein connecting said motor to said fixed reference point with said anti-rotation member comprises affixing a rod to said motor at a point spaced apart from said drive shaft and extending substantially parallel to said drive shaft towards said conduit whereby said conduit interferes with counter rotation of said rod and said motor about said drive shaft when said motor is operated.

4. The method of claim 3, wherein connecting said motor to said fixed reference point with said anti-rotation member comprises installing a restraining clamp on said conduit and receiving a distal end of said rod in an aperture of a size larger than that of said distal end of said rod in at least one dimension whereby rotation of the rod and motor about the drive shaft is restrained.

5. The method of claim 1, said valve handle adapter comprising a first adapter plate perpendicularly attached to one end of said drive shaft, and a mating adapter plate configured so as to be fitted beneath said valve handle into alignment with the first adapter plate, and secured thereto, wherein said valve handle is compressed therebetween.

6. The method of claim 1, said valve actuator comprising a DC motor, at least one battery, and a motor control circuit by which said motor can be operated by said battery, the method further comprising:

deploying a sensor at a desired location, in communication with said motor control circuit;

monitoring the sensor for a preselected condition for which a valve adjustment is desired; and upon the occurrence of said preselected condition, activating said motor control circuit, thereby activating said motor, resulting in a rotation of said valve handle.

7. The method of claim 6, said motor control circuit further comprising a motor control circuit condition monitoring sub-circuit and a power regulator configured to set a power consumption level of said monitoring sub-circuit in response to a state of said sensor, wherein said power consumption level of said monitoring sub-circuit is one of a plurality of power consumption levels and said state of the sensor is one of a plurality of states, wherein the ability of said sensor to activate said motor control circuit is unaffected by operation at said plurality of power consumption levels, the method further comprising:

monitoring said motor control circuit condition; and regulating a power consumption level to said monitoring sub-circuit based on a state of said sensor, wherein said power consumption level is one of a plurality of power consumption levels and said state of said sensor is one of a plurality of states.

8. The method of claim 7, wherein the monitoring sub-circuit operates at one power level when the motor is being run and operates at a reduced power level when the motor is idle.

9. A valve actuator system for automating the operation of a valve with a valve stem and valve handle, installed in or terminating a conduit, comprising:

a drive shaft attached to a valve handle adapter configured for attachment to said valve handle whereby said drive shaft is in substantially axial alignment with said valve stem and supported by said valve handle;

a floating motor supported by said drive shaft;

an anti-rotation member connecting said motor to a fixed reference point;

a power source;

a motor control circuit by which said power source may be connected to said motor; and a signal input to said motor control circuit;

whereupon the occurrence of a signal at said signal input triggers a motor operation.

10. The valve actuator system of claim 9, said motor control circuit further comprising a motor control circuit condition monitoring sub-circuit and a power regulator configured to set a power consumption level of said monitoring sub-circuit in response to a state of said signal, wherein said power consumption level of said monitoring sub-circuit is one of a plurality of power consumption levels and said state of said signal is one of a plurality of states and said motor control circuit is able to trigger a motor operation in response to a signal at said signal input to said motor control circuit at any of said plurality of power consumption levels.

11. The valve actuator system of claim 10, wherein said monitoring sub-circuit is operated at one power level when said motor is being driven and at a reduced power level when said motor is idle.

12. The valve actuator system of claim 9, said motor comprising a DC motor, a reduction or multiplier gearbox, and a housing securing said DC motor to said reduction or multiplier gearbox.

13. The valve actuator system of claim 9, wherein said motor is selected from the group consisting of spring motors, pneumatic motors, electric motors, and induction motors.

14. The valve actuator system of claim 9, wherein said power source is selected from the group consisting of springs, compressed air, AC power, DC power, magnetism, and battery power.

15. The valve actuator system of claim 9, said anti-rotation member comprising a rod fixed to and extending from said motor, at a point offset from said drive shaft, oriented substantially parallel to said drive shaft, through an aperture of a size larger than that of said rod in at least one dimension in a bracket secured to said conduit, whereby rotation of said motor is resisted.

16. The valve actuator system of claim 9, said anti-rotation member comprising a tension member fixed to and extending from said motor at a point offset from said drive shaft, and oriented substantially perpendicular to said drive shaft, whereby rotation of said motor is resisted.

17. The valve actuator system of claim 9, said anti-rotation member comprising a rod and a conduit bracket, said rod fixed to and extending from said motor at a point offset from said drive shaft and oriented substantially parallel to said drive shaft, said conduit bracket being attachable to said conduit by use of fasteners in a plane perpendicular to said drive shaft, and configured with an aperture of a size larger than that of a distal end of said rod in at least one dimension for receiving and laterally containing said distal end of said rod, whereby rotation of said motor is resisted.

18. A system for powering a manual control device configured with a manually operable handle attached to an operating shaft, comprising:
   a drive shaft attached to a handle adapter configured for non-rotational attachment to said handle whereby said drive shaft is in substantially axial alignment with the operating shaft and supported by said handle, whereby rotation of the drive shaft causes concurrent rotation of said operating shaft;
   a floating motor supported by said drive shaft;
   an anti-rotation member connecting said motor to a fixed reference point with respect to said device so as to inhibit rotation of said motor when energized;
   a power source;
   a motor control circuit by which communication between said power source and said motor is enabled; and
   a signal input to said motor control circuit;
   whereupon the occurrence of a signal at said signal input triggers a motor operation.

19. The system of claim 18, said motor control circuit further comprising a motor control circuit condition monitoring sub-circuit and a power regulator configured to set a power consumption level of said monitoring sub-circuit in response to a state of said signal, wherein said power consumption level of said monitoring sub-circuit is one of a plurality of power consumption levels and said state of said signal is one of a plurality of states, wherein said motor control circuit is able to trigger a motor operation in response to a signal at said signal input to said motor control circuit at any of said plurality of power consumption levels.

20. The system of claim 19, wherein said monitoring sub-circuit is operated at one power level when said motor is driven and at a reduced power level when the motor is idle.

* * * * *